US 10,061,233 B2

(12) United States Patent
Damgar et al.

(10) Patent No.: US 10,061,233 B2
(45) Date of Patent: *Aug. 28, 2018

(54) COMPUTER SYSTEM BACKUP PERFORMANCE OPTIMIZATION THROUGH PERFORMANCE ANALYTICS

(71) Applicant: International Business Machines Corporation, Armonk, NY (US)

(72) Inventors: James E. Damgar, Tucson, AZ (US); Daniel C. Wolfe, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 868 days.

This patent is subject to a terminal disclaimer.

(21) Appl. No.: 14/564,147

(22) Filed: Dec. 9, 2014

(65) Prior Publication Data

US 2016/0162373 A1    Jun. 9, 2016

(51) Int. Cl.
*G06F 7/00* (2006.01)
*G06F 17/00* (2006.01)
(Continued)

(52) U.S. Cl.
CPC ..... *G03G 15/2003* (2013.01); *G06F 9/45558* (2013.01); *G06F 9/505* (2013.01);
(Continued)

(58) Field of Classification Search
CPC ............. G06F 9/45558; G06F 11/1448; G06F 11/1451; G06F 11/1456; G06F 11/1464; G06F 11/1469; G06F 1/3409; G06F 11/302; G06F 2009/4557; G06F 2009/45575; G06F 2201/805; G06F 2201/815; G06F 2201/82;
(Continued)

(56) References Cited

U.S. PATENT DOCUMENTS 7,844,756 B2    11/2010    Cannon et al.
8,161,180 B1    4/2012    Swift et al.
(Continued)

FOREIGN PATENT DOCUMENTS

WO    2014035416 A1    3/2014

OTHER PUBLICATIONS

Damgar et al., " Computer System Backup Performance Optimization Through Performance Analytics", U.S. Appl. No. 15/052,926, filed Feb. 25, 2016.
(Continued)

*Primary Examiner* — Azam Cheema
(74) *Attorney, Agent, or Firm* — David B. Woycechowsky

(57) ABSTRACT

Embodiments in accordance with the present invention disclose a method, computer program product, and system for optimizing performance of a computer backup solution that includes at least two data movers. The automated method includes measuring data mover performance during operation of a backup cycle, and optimizing the performance of data movers by increasing or decreasing the number of threads operating concurrently in the data movers. The method further includes computation of performance rankings of the data movers and shifting workload among the data movers in accordance with their respective performance rankings, such that the computer backup solution converges toward an optimized configuration.

20 Claims, 6 Drawing Sheets

(51) Int. Cl.
*G03G 15/20* (2006.01)
*G06F 11/14* (2006.01)
*G06F 9/455* (2018.01)
*G06F 9/50* (2006.01)
*G06F 11/34* (2006.01)
*G06F 11/30* (2006.01)

(52) U.S. Cl.
CPC ........ *G06F 9/5083* (2013.01); *G06F 11/1448* (2013.01); *G06F 11/1451* (2013.01); *G06F 11/1456* (2013.01); *G06F 11/1464* (2013.01); *G06F 11/1469* (2013.01); *G06F 11/3409* (2013.01); *G06F 11/302* (2013.01); *G06F 2009/4557* (2013.01); *G06F 2009/45575* (2013.01); *G06F 2201/805* (2013.01); *G06F 2201/815* (2013.01); *G06F 2201/82* (2013.01); *G06F 2201/875* (2013.01)

(58) Field of Classification Search
CPC ... G06F 2201/875; G06F 9/505; G06F 9/5083
See application file for complete search history.

(56) References Cited

U.S. PATENT DOCUMENTS

| | | | |
|---|---|---|---|
| 8,458,419 B2 | 6/2013 | Basler et al. | |
| 9,063,668 B1* | 6/2015 | Jung | G06F 3/0658 |
| 9,542,275 B2* | 1/2017 | Damgar | G06F 9/505 |
| 9,606,480 B2* | 3/2017 | Damgar | G06F 9/505 |
| 9,619,337 B2* | 4/2017 | Damgar | G06F 11/1456 |
| 2005/0114566 A1 | 5/2005 | Chen et al. | |
| 2008/0196043 A1* | 8/2008 | Feinleib | G06F 11/0712 719/319 |
| 2014/0189301 A1* | 7/2014 | Gorbatov | G06F 1/3206 712/30 |
| 2014/0196056 A1* | 7/2014 | Kottomtharayil | G06F 9/505 718/105 |

OTHER PUBLICATIONS

Appendix P—List of IBM Patents or Patent Applications Treated as Related. 2 pages.

Appendix P—List of IBM Patents or Patent Applications Treated as Related, Filed Nov. 9, 2016, 2 pages.

Damgar et al., "Computer System Backup Performance Optimization Through Performance Analytics", U.S. Appl. No. 15/338,525, filed Oct. 31, 2016, 28 pages.

Damgar et al., "Computer System Backup Performance Optimization Through Performance Analytics", U.S. Appl. No. 15/340,080, filed Nov. 1, 2016, 28 pages.

* cited by examiner

COMPUTER SYSTEM BACKUP PERFORMANCE OPTIMIZATION THROUGH PERFORMANCE ANALYTICS

BACKGROUND OF THE INVENTION

The present invention relates generally to the field of computer system backup, and more particularly to dynamically optimizing performance of a computer system backup solution.

In information technology, a "backup" refers to the copying and archiving of computer data so it may be used to restore the original data. Backed up data may be stored on one or more servers, which may be geographically remote from the source system and each other. Backups have at least two distinct purposes, one of which is to enable recovery of data after it has been lost, for example due to deletion, hardware failure or physical loss, a disastrous event, etc. Another purpose of backups may be to recover a previous version of data following an erroneous or premature update.

Performing backups from large computer systems presents challenges in managing and moving large volumes of data from source machines to the backup servers in a time efficient, and cost efficient manner.

SUMMARY

Embodiments in accordance with the present invention disclose a method, computer program product, and system for optimizing performance of a computer backup solution for virtual machines that includes at least two data movers. Data movers are the logical processes that transfer backup data from the source virtual machine to the backup server. The automated method includes measuring data mover performance during operation of a backup cycle and optimizing the performance of data movers by increasing or decreasing the number of threads operating concurrently in the data movers. The method further includes computation of performance rankings of the data movers and shifting workload among the data movers in accordance with their respective performance rankings, such that the computer backup solution converges toward an optimized configuration.

DETAILED DESCRIPTION

Figure 1:
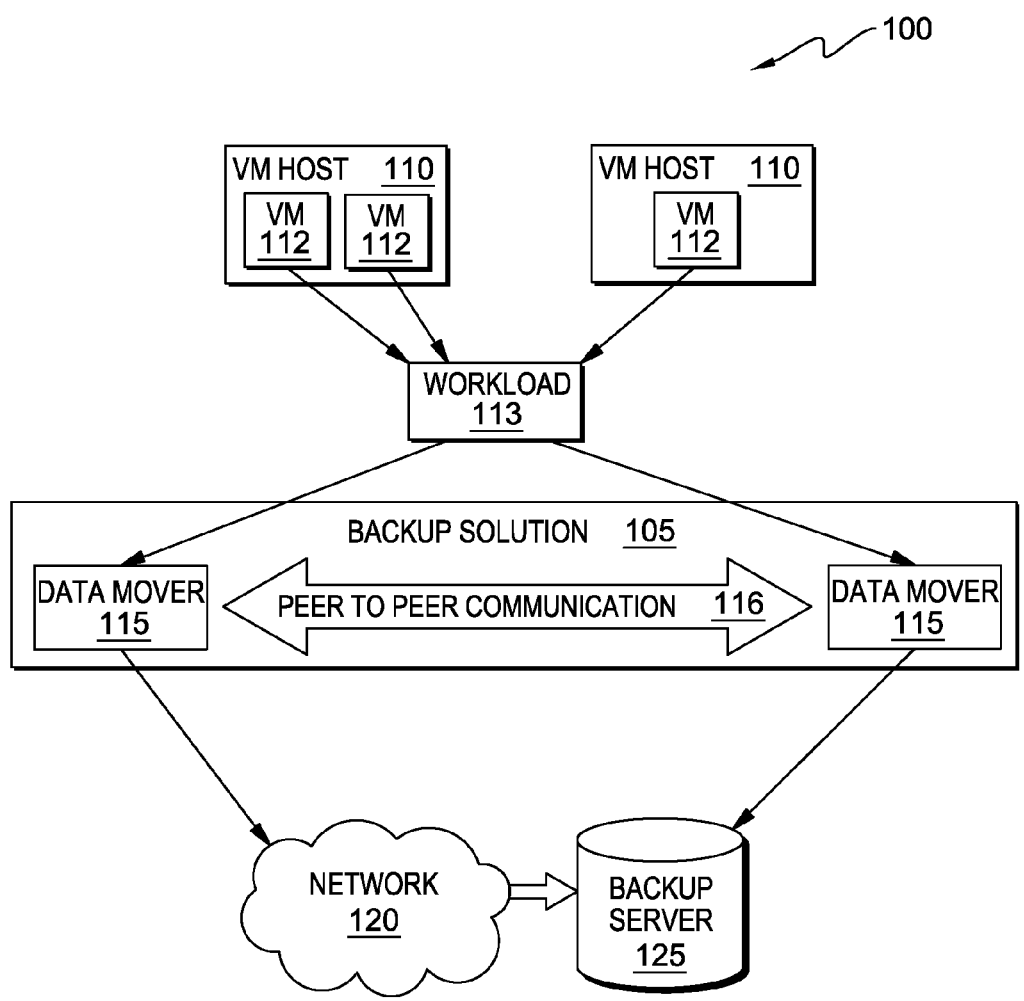
FIG. 1 is a generic representation of a computing environment, generally designated with numeral 100, within which embodiments in accordance with the present invention may operate.

The architecture of a virtual machine backup solution is often hampered by an inability to effectively place, or efficiently optimize, the allocation of workload among data movers processing virtual machine data for ingestion into a backup product. For example, data movers may be placed on host systems but non-optimally positioned such that they fail to provide the best aggregate throughput for their assigned virtual machine workload. Furthermore, a set of data movers may have the overall workload sub-optimally partitioned among them.

In general, a virtual machine backup solution may be deployed manually, by an individual or a team. Available planning assistance may include "best practices" guides, worksheets, or simple calculators intended to help a user to estimate environmental resource requirements and to generate hints about where to place data movers for optimal efficiency. Often missing is the ability to validate environmental assumptions and react dynamically, automatically, and analytically to actual performance once a backup solution has been deployed. System administrators, attempting to seek improvements, often perform optimization manually, through an iterative trial and error process, as backup system performance is evaluated and modifications made.

Another drawback of existing virtual machine backup solutions is their inability dynamically to re-allocate the workload across data movers and, for a given data mover, during and between backup cycles. Configuration settings govern the workload allocated to a given data mover, and aspects of how that workload is processed by the data mover. Updates to the configuration settings are generally made by manual input.

A backup solution is an overall backup system that, among other things, governs the operation of data movers, and determines an optimal mapping of data movers to virtual machine classes. A data mover is a client backup application instance which reads data from a virtual machine infrastructure and sends the data to a backup server. A data mover can be a physical data mover, or a virtual data mover. A physical data mover resides on a physical host system whereas a virtual data mover is a data mover residing on a virtual machine.

A backup cycle is one complete backup operation, wherein data from the system being backed up is copied from the system to the backup storage. Typically, a backup cycle occurs within a pre-defined time interval referred to as a backup window. A backup cycle can be triggered automatically, for example to occur on a pre-defined schedule, or in response to user input or other events.

Embodiments in accordance with the present invention implement a logic-based computer system backup solution, to enable automatic modification of the backup solution configuration. Modifications of the backup solution configuration can take place during backup cycles, and between backup cycles, to optimize performance of the backup solution.

A plurality of data movers use a peer-to-peer model to communicate with each other during operation of a backup cycle. In cases where two data movers need to communicate and there is no direct network connection between them, the peer-to-peer model includes an ability to route the communications through one or more servers. During a backup cycle, various performance statistics are monitored and recorded to provide a basis on which to modify configuration of the backup solution. During a backup cycle, performance of each data mover is continually monitored. Aspects of the backup solution configuration can be modified dynamically, for example, by shifting portions of the total backup workload among the data movers, such that the shifted portions of the workload are migrated to data movers proving to have higher throughput than the throughput achieved by the data movers away from which the workload is shifted.

The term "throughput" should be understood by one skilled in the relevant art to be a measure of an aggregate rate of data transfer. The throughput may be measured in megabytes per second, or other suitable units of data transfer.

The terms "local" and "peer" are used herein with reference to data movers. Any data mover in a backup solution can be considered to be a local data mover. When discussion is focused on a particular data mover, the particular data mover is referred to as the local data mover and other data movers in the backup solution are considered to be peer data movers.

If performance analysis determines that a local data mover is faster than one or more peer data movers, at processing workload from virtual machines of a first class, and slower than one or more peer data movers, at processing workload from virtual machines of a second class, the local data mover may subsequently be assigned a larger proportion of its workload from virtual machines of the first class, and assigned a smaller proportion of its workload from virtual machines of the second class. Workload reassignment can occur dynamically, during operation of a backup cycle, or between backup cycles, wherein the reassigned workload can be implemented in a subsequent backup cycle.

In some embodiments in accordance with the present invention, virtual machines are classified according to certain characteristics, such as for example, its hostname, its data store location, its network path or other characteristics. Taken together, the characteristics are considered to define a particular virtual machine class. Any number of relevant characteristics can be chosen to classify virtual machines in a way intended to be meaningful with regard to backup performance. If a particular classification scheme proves to be ineffective in the optimization process, other classification schemes can be implemented.

Furthermore, performance statistics from the data movers, as well as from the overall backup solution, are analyzed automatically, during and between backup cycles. Based on the analysis results, mapping of data movers to various classes of virtual machine can automatically be reconfigured, thus continually optimizing overall performance of the individual data movers leading to optimization of the overall backup solution. Optimization is thus automatic, dynamic and responsive to changes as the computer system, and its configuration and operating parameters, evolve during backup cycles and over time.

Performance statistics can comprise various types of data pertaining to the performance of a data mover, to provide a basis on which meaningful performance comparisons between a plurality of data movers can be derived. The particular types of data comprising performance statistics gathered in some embodiments in accordance with the present invention are implementation aspects.

In embodiments in accordance with the present invention, the backup solution employs a peer-to-peer model wherein, either directly or through one or more intermediate servers, the plurality of data movers within the backup solution automatically communicate among themselves. A data mover is a peer to each other of the plurality of data movers included in the backup solution. Data movers exchange performance statistics in the peer-to-peer model to continually self-optimize. More detailed information with regard to the peer-to-peer model can be found with reference to FIGS. 3A through 3C and the relevant discussions thereof.

An internal performance model is maintained and updated by each data mover, and communicated among its peer data movers. In some embodiments in accordance with the present invention, performance models from the data movers are also communicated to the backup solution as well. A performance model comprises at least normalized "performance ratios" for the virtual machine classes processed by a data mover.

In some embodiments in accordance with the present invention, the following formula is used to compute a normalized performance ratio for a data mover:

$$PR_1 = \frac{\text{Throughput of } DM_1}{\text{Combined throughput of all } DMs}$$

Where:

$PR_1$=Normalized performance ratio of data mover $DM_1$ operating within the backup solution, and $DM_1$ processing data from virtual machines of a particular class.

Throughput of $DM_1$=Throughput of data mover $DM_1$, operating within the backup solution, and $DM_1$ processing data from virtual machines of the particular class.

Combined throughput of all DMs=Total throughput of all data movers, including $DM_1$, operating within the backup solution, the data movers processing data from virtual machines of the particular class.

Example computations of normalized performance ratios follow: Hypothetical performance figures for data movers $DM_1$ and $DM_2$, both data movers processing data from virtual machines of classes "A" and "B" ($VM_A$ and $VM_B$ respectively) are given. In this example, the following throughput results (expressed in MB/sec or other suitable unit of measure) given as:

$DM_1$ processes $VM_A$ at 40, and $VM_B$ at 55.

$DM_2$ processes $VM_A$ at 30, and $VM_B$ at 60.

The normalized performance ratios (unitless) of $DM_1$ and $DM_2$ can be computed as follows:

| | Normalized Performance Ratios | |
|---|---|---|
| | $DM_1$ | $DM_2$ |
| VMA | $\frac{40}{40+30} = 0.57$ | $\frac{30}{40+30} = 0.43$ |
| VMB | $\frac{55}{55+60} = 0.48$ | $\frac{60}{55+60} = 0.52$ |

From the perspective of the data movers, the results indicate that $DM_1$ has a higher performance ranking when processing $VM_A$ than does $VM_B$ (0.57 vs. 0.48 respectively), and $DM_2$ has a higher performance ranking when processing $VM_B$ than does $VM_A$ (0.52 vs. 0.43 respectively). Accordingly, from the perspective of the virtual machines, it can be seen that $VM_A$ is processed faster by $DM_1$ than by $DM_2$ (0.57 vs. 0.43 respectively) whereas $VM_B$ is processed faster by $DM_2$ than by $DM_1$ (0.52 vs. 0.48 respectively). Based at least on these rankings, embodiments in accordance with the present invention would tend to shift at least some workload from virtual machines of class "A" from $DM_2$ to $DM_1$ and to shift at least some workload from virtual machines of class "B" from $DM_1$ to $DM_2$, thus approaching an optimized configuration for the backup solution. Some or all of the workload shifting may occur during operation of the backup cycle or at initialization or operation of a subsequent backup cycle.

To further optimize performance of a data mover, embodiments in accordance with the present invention utilize multiple parallel sessions, referred to herein as "threads," operating concurrently in the data mover. During a backup cycle, a data mover can dynamically increase or decrease the number of threads it uses. A data mover makes use of a plurality of "producer" threads, wherein data is read into the data mover from a virtual machine. Moreover, a data mover makes use of a plurality of "consumer" threads, wherein data is forwarded from the data mover to the backup server. The plurality of producer threads is referred to herein as the producer side of a data mover. The plurality of consumer threads is referred to as the consumer side.

Informed by performance monitoring, a data mover can determine: (a) If more threads are possible on either the producer or consumer sides; (b) whether increasing the number of threads on either side improves data mover throughput; and (c) whether more or fewer threads are needed, on one side or the other, to achieve a relative throughput balance between the producer and consumer sides.

Achieving relative throughput balance in a data mover between the producer and consumer sides is a desired aspect of embodiments in accordance with the present invention. If a data mover is taking in data (producer side) significantly faster than it can discharge it (consumer side), a bottleneck exists wherein data accumulates at the data mover, for example in a buffer, and fails to move on toward the backup server in a timely fashion. If this imbalance persists long enough, the buffer can fill up, and the data mover can only accept additional data as buffer space is released and made available. Alternatively, if the consumer side is significantly faster than the producer side, the data mover may have unused capacity that could be put into service by increasing throughput on the producer side. Thus, if there exists a significant imbalance between the producer and consumer sides it is likely that the data mover is failing to deliver its maximum throughput.

In embodiments in according with the present invention, a data mover can monitor the balance between its producer and consumer sides and can add or remove threads on either side, as appropriate, so as to approach a balanced condition. Further detail is given with reference to FIG. 3C and the detailed description thereof.

Advantages afforded by embodiments in accordance with the present invention include: (a) Dynamic and continual modification of workload distribution among data movers, informed by performance monitoring and peer-to-peer communication among data movers, during a backup cycle; (b) Improved allocation of workload on subsequent backup cycles, can be based at least in part on performance results of previous cycles; and (c) Dynamic modification of internal parallelism in a data mover, during a backup cycle, to achieve optimal throughput of the data mover.

Example embodiments in accordance with the present invention will now be described in detail with reference to the drawing figures. FIG. 1 is a generic representation of a computing environment, generally designated with numeral 100, within which embodiments in accordance with the present invention may operate.

Virtual machine host 110 comprises one or more physical systems hosting one or more virtual machines, designated VM 112.

Backup solution 105 comprises one or more of data mover 115, and software (not shown) which operates during, and between, backup cycles. Detailed discussion of the software is found below with reference to FIGS. 2, 3A, 3B, 3C and the detailed descriptions thereof.

Data mover 115 reads data from one or more instances of VM 112 and sends the data to backup server 125. Data movers 115 communicate among each other, and with backup solution 105, such communication represented as peer to peer communication 116 or peer to server communication (not shown).

VM 112 and data mover 115 may be hosted on the same or on different physical or virtual machines. Data being backed up is designated as workload 113, which is transported through data mover 115 and subsequently sent to backup server 125, via network 120. Backup server 125 may comprise one or more physical servers. Backup server 125 can be any machine or combination of machines capable of receiving, storing, retrieving and sending data, such as for example, a cloud-based object grid data storage solution. Workload 113 comprises the totality of data to be backed up by backup solution 105.

The terms "workload subset" and "subset" are synonymously defined herein as that portion of workload 113 assigned to a data mover 115, the portion of workload originating from a single instance of VM 112. The portion of workload 113 that is assigned to a data mover 115 can thus be considered as a series of one or more subsets of workload 113, each subset originating from a distinct instance of VM 112.

During a backup cycle, in response to certain circumstances, a subset of workload 113 can be reassigned among the plurality of instances of data mover 115 within backup solution 105, the purpose of the reassignment generally being to improve overall performance of backup solution 105. However, reassignments could be made for reasons other than improving overall performance, such as for example, to reassign workload from a data mover 115 that fails, loses its network connectivity, or is otherwise unable to process some or all of its assigned workload 113. Further details, relative to reassignment, particularly for throughput improvement, can be found below, with reference to FIG. 3C and the detailed description thereof.

In general, network 120 can be any combination of connections and protocols that will support communications between data mover 115 and backup server 125. Network 120 can include, for example, a local area network (LAN), a wide area network (WAN) such as the internet, or any combination of the preceding, and can further include wired, wireless, and/or fiber optic connections.

Figure 2:
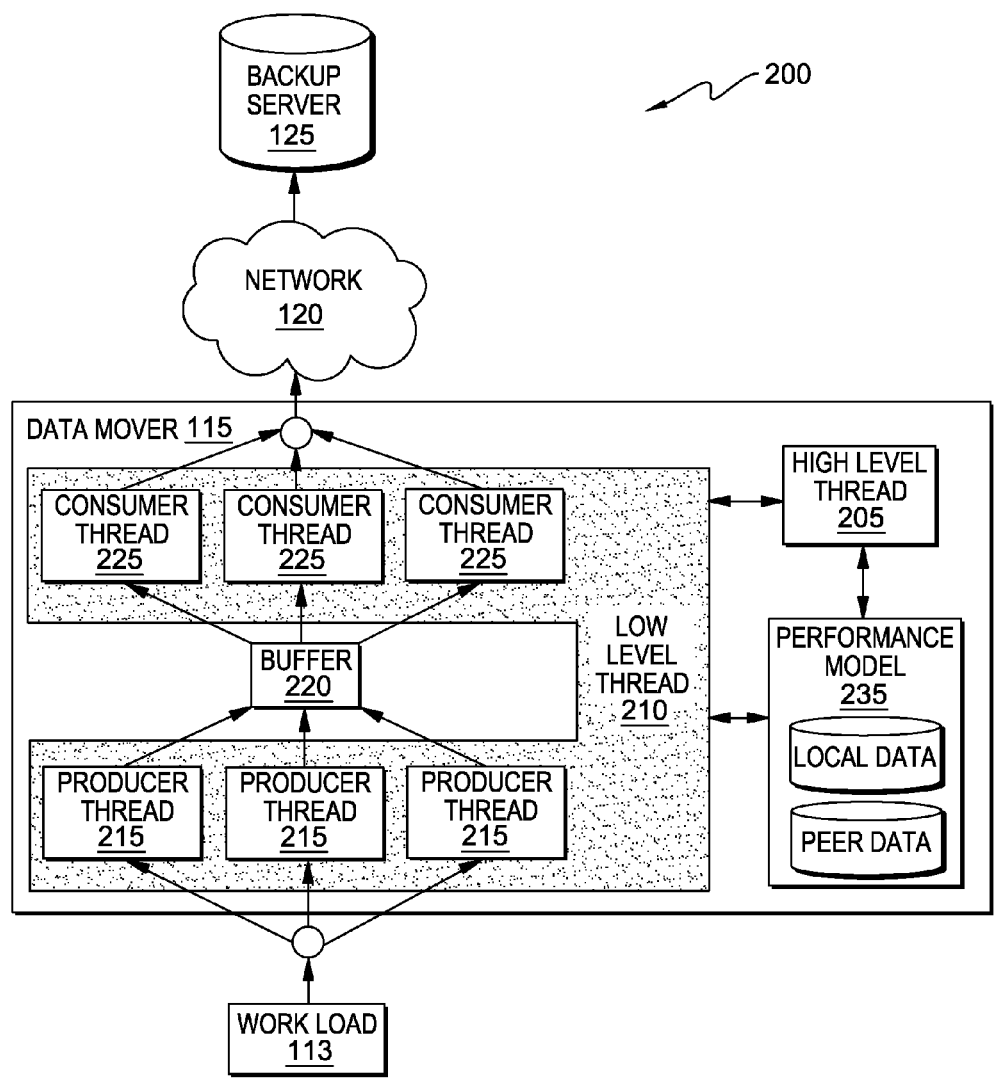
FIG. 2 represents a data mover 115, generally designated with numeral 200, in an embodiment in accordance with the present invention.

FIG. 2 represents a data mover 115, generally designated with numeral 200, in an embodiment in accordance with the present invention. Data mover 115 comprises buffer 220 into which incoming workload 113 is written by at least one producer thread 215. Outgoing workload 113 is read from buffer 220 by at least one consumer thread 225, the outgoing workload 113 being transmitted to backup server 125 via network 120. Data mover 115 is operationally coupled with low level thread 210, high level thread 205, and performance model 235.

As used herein, the terms "local" and "peer" refer to the data movers. A data mover referenced in particular, is referred to as a "local data mover". From the perspective of a local data mover, other data movers in backup solution 105 are "peer data movers". The same distinction (local/peer) will be used, when convenient, with reference to workload, performance model, low and high level threads, and other aspects of local and peer data movers, wherein for example, local workload refers to the workload being processed by a local data mover whereas peer workload refers to workload being processed by one or more peer data movers.

In at least one embodiment in accordance with the present invention, backup solution 105 includes: a) Top level functions; b) High level threads 205; and c) Low level threads 210. Top level functions include: 1) Overall coordination of backup solution 105; 2) Identification of available data movers and the distribution of workload 113 among the data movers; and 3) Continuity of data mover performance statistics from one backup cycle to the next.

Figure 3A:
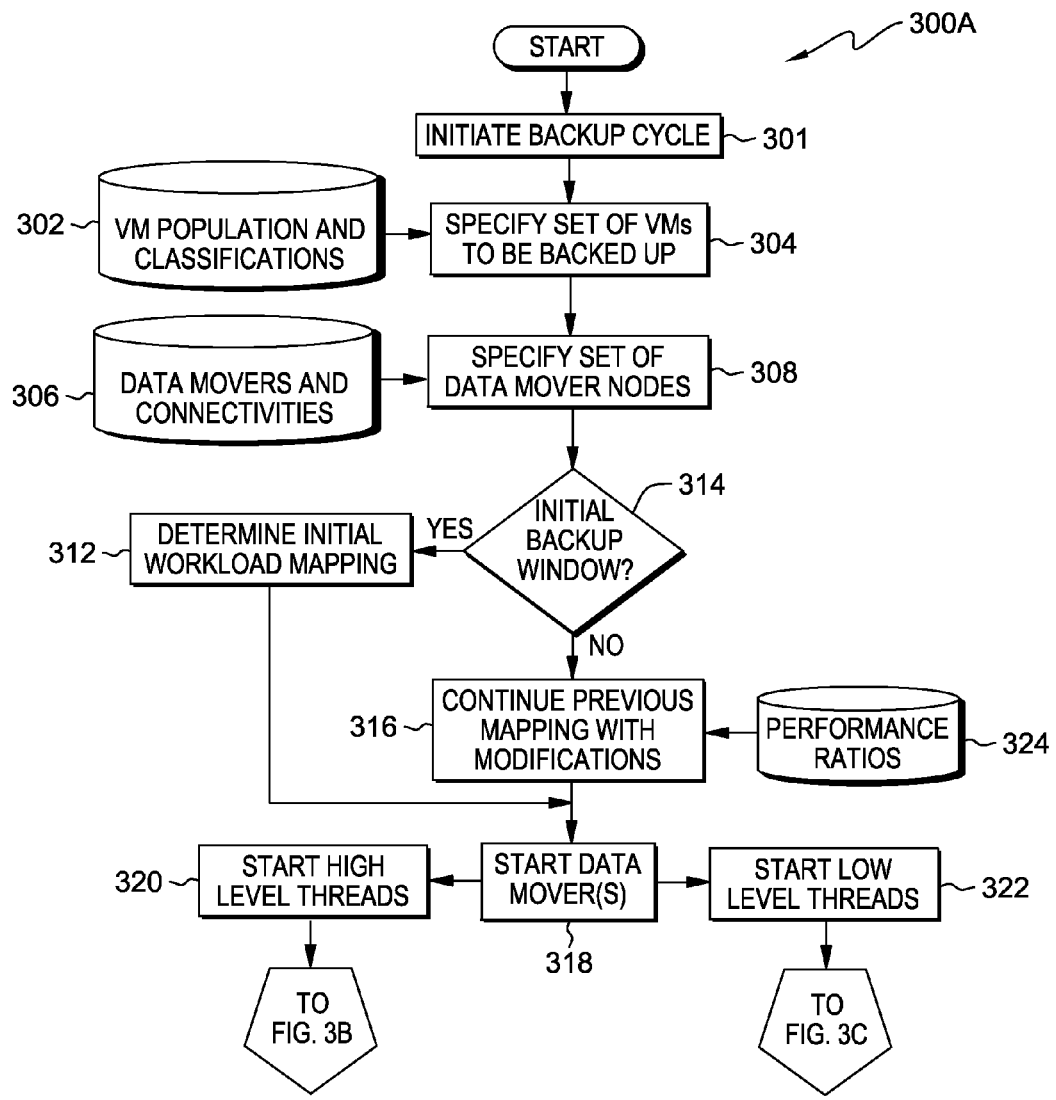
FIG. 3A is a flowchart depicting the top level functions of backup solution 105 operating in an embodiment in accordance with the present invention, and generally designated with numeral 300A.

FIG. 3A is a flowchart depicting the top level functions of backup solution 105 operating in an embodiment in accordance with the present invention, and generally designated with numeral 300A. Among the top level functions of backup solution 105 are: 1) To assign instances of data mover 115 to instances of VM 112; and 2) To start instances of data mover 115 and launch a high level thread 205 and a low level thread 210 associated with each data mover 115.

Referring to FIG. 3A, in response to initiating a backup cycle (function block 301), a set of VM 112 machines which are to be backed up, is determined (function block 304) with reference to an inventory of VM 112 machines (database 302). A set of available instances of data mover 115 is identified (function block 308) with reference to at least an inventory of instances of data mover 115 and their respective connectivities (database 306). If a backup cycle is being performed for the first time (for a given installation of backup solution 105) (decision 314, "Yes" branch), workload 113 mapping is determined in accordance with algorithms pre-defined as aspects of an embodiment in accordance with the present invention.

If a backup cycle is being run subsequent to a first time (decision 314, "No" branch), instances of VM 112 which were not included in the previous backup cycle, if any, are assigned to instances of data mover 115 (function block 316). With reference to at least normalized performance ratios determined in one or more previous backup cycles (database 324), existing workload 113 mapping can be modified (function block 316).

One or more data movers are started (function block 318) and may operate concurrently. High level threads 205 and low level threads 210 are started (function blocks 320 and 322 respectively), there being a high level thread 205 and a low level thread 210 in operational concert with each data mover 115. It should be understood that there will exist a one-to-one correspondence between high level threads 205 and instances of data mover 115 and between low level threads 210 and instances of data mover 115.

Figure 3B:
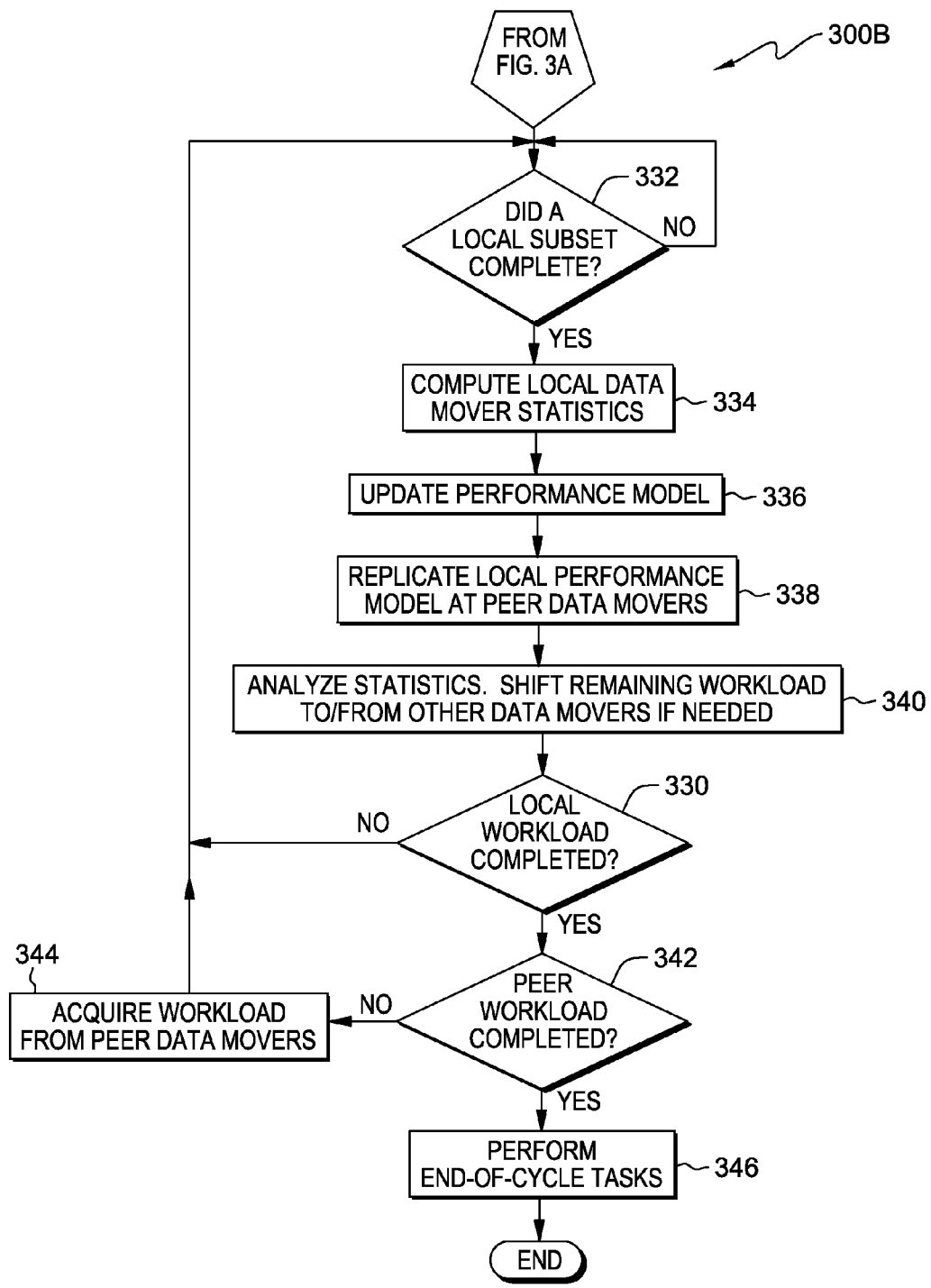
FIG. 3B, is a flowchart, generally designated with numeral 300B, illustrating functions of high level thread 205, performed by a local data mover 115 in at least one embodiment in accordance with the present invention.

FIG. 3B is a flowchart, generally designated with numeral 300B, illustrating functions of high level thread 205, performed by a local data mover 115 in at least one embodiment in accordance with the present invention. FIG. 3B continues from FIG. 3A.

A local instance of high level thread 205 is operationally coupled with local data mover 115. High level thread 205 controls at least the instrumented monitoring of a local data mover 115, computation of performance statistics based at least in part on results of the instrumented monitoring, communications with instances of peer data mover 115 and/or backup solution 105, and shifting of workload 113 between a local data mover 115 and instances of peer data mover 115.

High level thread 205, when started, may initially enter a wait state (decision 332 and its "No" branch, respectively). Responsive to completion of a local subset, by a local data mover 115 (decision 332, "Yes" branch), performance statistics for local data mover 115, the statistics associated with the subset just completed, are computed (function block 334). Performance model 235 is updated (function block 336), and replicated at peer data movers 112 (function block 338).

Performance statistics of peer data movers 115 are similarly replicated at local data mover 115 as processing of peer workload subsets is completed. Performance statistics of local and peer data movers 112 are analyzed to determine what changes, if any, in the distribution of workload 113 among instances of data mover 115 appear likely to improve throughput of backup solution 105 (function block 340). The analysis may include determining performance ratios for a local data mover 115, relative to each VM 112 class processed by the local data mover 115, and comparing the local performance ratios with peer performance ratios. Based at least in part on the analysis, remaining workload may be shifted between local data mover 115 and instances of peer data mover 115 (function block 340).

If local workload 113 has not been completed (function block 330, "No" branch), high level thread resumes a wait state (function block 332 and its "No" branch).

If local workload 113 has been completed (function block 330, "Yes" branch), but peer workload 113 is still pending at instances of peer data mover 115 (function block 342, "No" branch), local data mover 115 may acquire workload from at least one peer data mover 115 (function block 344), the newly acquired workload becoming local workload 113. Responsive to acquiring additional local workload 113, high level thread 205 enters a wait state (decision 332 and its "No" branch, respectively). If local and peer workloads are complete (function block 342, "Yes" branch), high level thread may perform end-of-cycle tasks (function block 346) such as sending final performance results, including performance ratios, to the top level thread of FIG. 3A, after which processing of high level thread 205 ends.

Figure 3C:
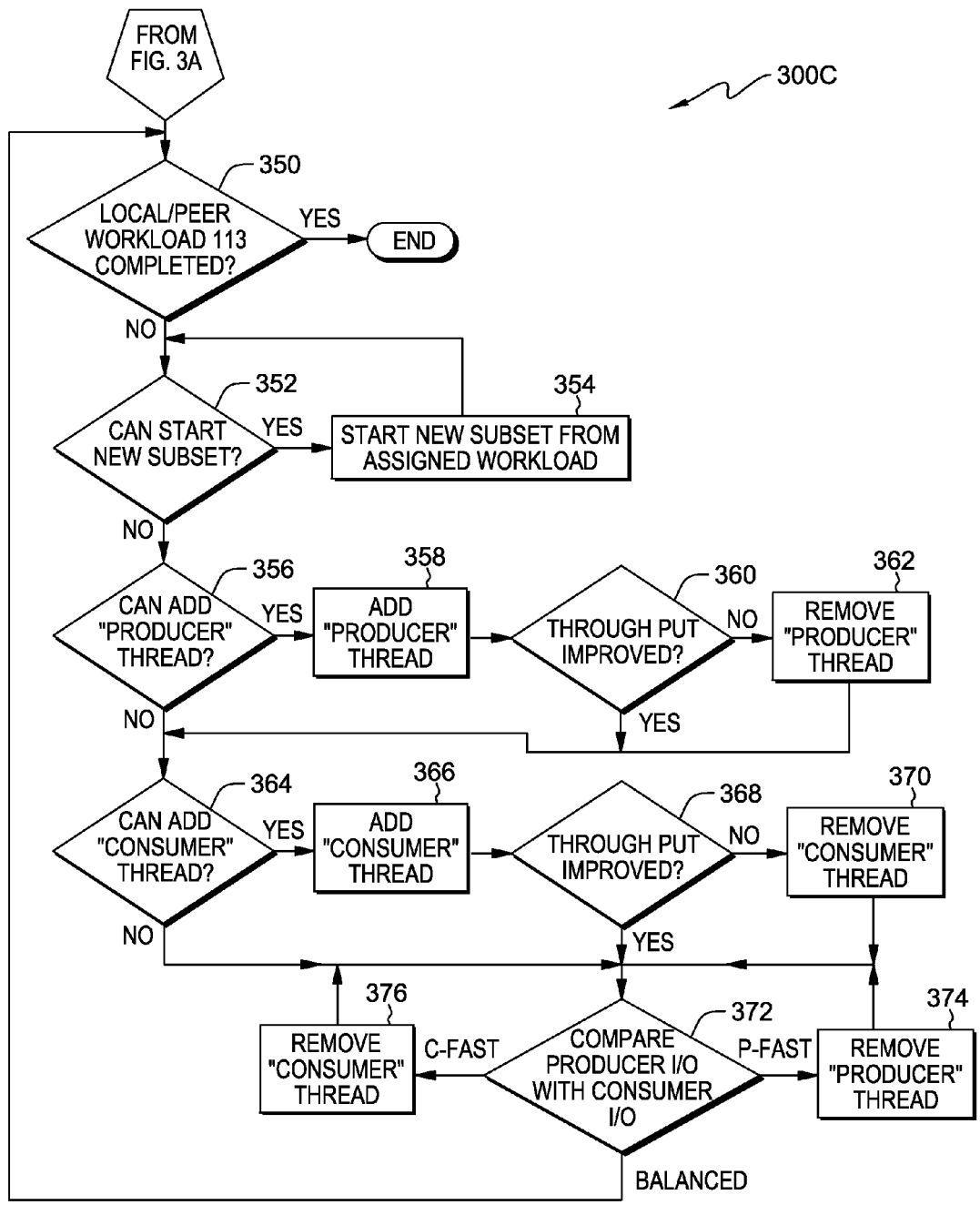
FIG. 3C is a flowchart illustrating functions of a low level thread 210, generally designated with numeral 300C, performed by data mover 115, operating in at least one embodiment in accordance with the present invention.

FIG. 3C is a flowchart illustrating functions of a low level thread 210, generally designated with numeral 300C, performed by data mover 115, operating in at least one embodiment in accordance with the present invention. FIG. 3C continues from FIG. 3A.

An instance of low level thread 210 is operationally coupled with data mover 115 to control one or more producer threads 215 and one or more consumer threads 225. Low level thread 210 optimizes performance of local data mover 115 by increasing or decreasing the numbers of producer threads 215 and consumer threads 225, to achieve a maximum practical throughput of data mover 115. The number of producer threads 215 operating concurrently in data mover 115, and the number of consumer threads 225 operating concurrently in data mover 115 need not be equal.

If processing of local workload 113 has been completed (decision 350, "Yes" branch), processing ends. If local workload 113 has not been completed (decision 350, "No" branch) and local data mover 115 is able to start backing up a new subset (decision 352, "Yes" branch), data mover 115 starts as many new subsets as it is able to start (function block 354 and decision 352, "Yes" branch, respectively and iteratively) from its assigned workload.

If data mover 115 is not able to start a new virtual machine backup (decision 352, "No" branch), data mover 115 optimizes the numbers of "producer" and "consumer" threads operating. If data mover 115 is able to add a producer thread 215 (decision 356, "Yes" branch), it adds the producer thread 215 (function block 358). If throughput of data mover 115 does not improve in response to adding the producer thread 215 (decision 360, "No" branch), data mover 115 removes a producer thread 215 (function block 362).

If data mover 115 can add a consumer thread 225 (decision 364, "Yes" branch), it adds a consumer thread 225 (function block 366). If throughput of data mover 115 does not improve in response to adding the consumer thread 225 (decision 368, "No" branch), data mover 115 removes a consumer thread 225 (function block 370).

Responsive to any of the following enumerated conditions or events (a through e), data mover 115 performs a comparison (decision 372) to determine the relative throughput balance between its "producer" and "consumer" sides: a) Data mover 115 cannot add a consumer thread 225 (decision 364, "No" branch); b) Data mover 115 adds a consumer thread 225 and throughput improves (decision 368, "Yes" branch); c) Data mover 115 removes a consumer thread 225 (function block 370); d) Data mover 115 removes a consumer thread 225 (function block 376); and e) Data mover 115 removes a producer thread 215 (function block 374).

If throughput of data mover 115's consumer side exceeds, by an amount greater than a specified threshold value, the throughput of its producer side (decision 372, "C-Fast" branch), a consumer thread 225 is removed (function block 376) and the comparison is repeated (decision 372, "C Fast" branch and block 376) iteratively, until the consumer side throughput no longer exceeds the producer side throughput by more than the specified threshold.

If throughput of data mover 115's producer side exceeds, by an amount greater than a specified threshold value, the throughput of its consumer side (decision 372, "P-Fast" branch), a producer thread 215 is removed (function block 374) and the comparison is repeated (decision 372, "P Fast" branch and block 374) iteratively, until the producer side throughput no longer exceeds the consumer side throughput by more than the specified threshold.

If the difference between throughputs of the producer side and the consumer side is less than a specified threshold value, data mover 115 is considered to be in balance (decision 372, "Balanced" branch), in response to which data mover 115 determines whether local workload 113 has been completed (decision 350). If local workload 113 has been completed (decision 350, "Yes" branch), processing ends.

When a data mover 115, within backup solution 105 is hosted on a virtual machine that is also served by backup solution 105, the data mover is, by default, assigned workload from the virtual machine on which the data mover resides. Such a case is defined herein as a "trivial" case. Trivial cases are generally excluded from workload shifting and randomization aspects of embodiments in accordance with the present invention, based on the assumption that a data mover hosted on a virtual machine that is being backed up, will likely have the greatest performance due to the close network proximity the data mover and the virtual machine have to each other. However, it is to be understood that this disclosure does not preclude trivial cases from inclusion in workload shifting and randomization aspects, nor does it preclude a data mover operating in a trivial case from being assigned workload from other virtual machines in addition to the trivial virtual machine.

One aspect of embodiments in accordance with the present invention is a goal to distribute workload from as many non-trivial VM 112 classes as is practical across as many instances of data mover 115 as practical, such that backup solution 105 converges toward an optimal configuration with respect to data mover/virtual machine class combinations. To further this goal, "randomization" is conducted periodically between backup cycles so that a data mover 115's performance, when processing as many distinct virtual machine classes as is practical, can be measured. This randomization could be conducted according to the following rules, or to other rules as established in various implementations:

A) If a virtual machine class exists which has not yet been processed by a particular data mover 115, select at least one instance of VM 112 from the virtual machine class and process workload from the selected at least one virtual machine instances through the data mover. The basis used to select a VM 112 could be a random or pseudo-random selection algorithm or other selection method.

B) Periodically, some instances of VM 112, of a particular class, can be assigned to a particular data mover 115, if the data mover hasn't recently processed workload from that virtual machine class.

To modify mapping of workload 113 in embodiments in accordance with the present invention, local data mover 115 communicates with instances of peer data mover 115 to update its local internal model and the local models of instances of peer data mover 115. Local data mover 115 can analyze its own performance ratios by VM 112 class(es), and compare its ratios to those of instances of peer data mover 115 operating on the same VM 112 class(es). Local data mover 115 can offer, to instances of peer data movers 115, one or more subsets of workload 113 from virtual machines of a class which local data mover 115 achieves lower throughput. Local data mover 115 can also seek to acquire one or more workload subsets for which it achieves higher throughput, the one or more workload subsets offered by one or more instances of peer data mover 115. In some embodiments in accordance with the present invention, only a few workload subsets are moved at any one time, so as to avoid sudden performance fluctuations of backup solution 105.

In the foregoing discussion relative to workload shifting and randomization, the quantitative definitions of the phrases "best," "periodically," "some," "recently," and "few" are implementation aspects in embodiments in accordance with the present invention.

After completion of a backup cycle, at least the final mapping of instances of data mover 115 to instances of VM 112, and the respective performance statistics, are retained for use in the next back up cycle, to maintain continuity of the optimization that has taken place, and to provide a basis from which to establish initial operating parameters for the next backup cycle.

Figure 4:
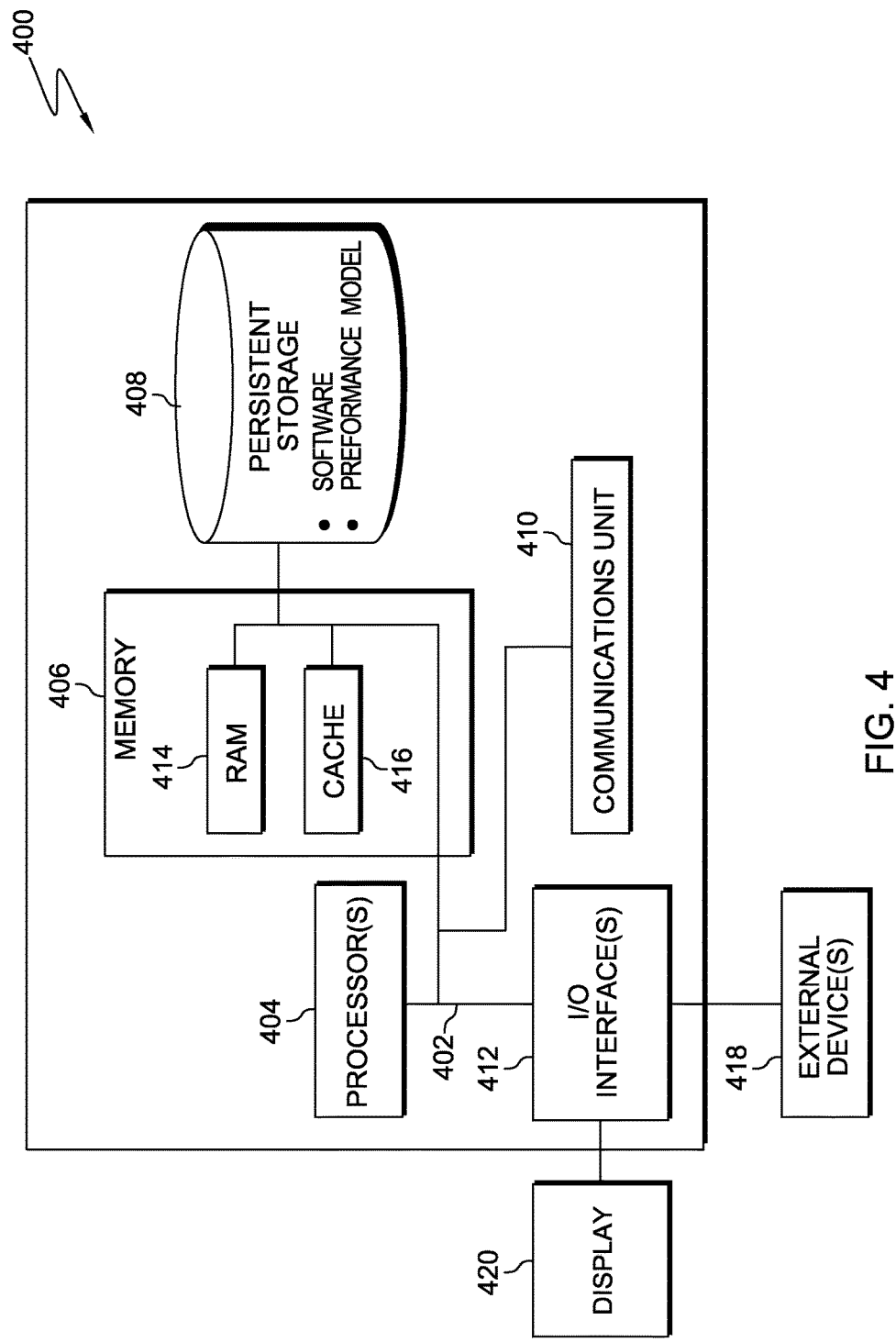
FIG. 4 depicts a block diagram of components of data processing system 400, representative of any computing system within data processing environment 100 in accordance with an illustrative embodiment of the present invention.

FIG. 4 depicts a block diagram of components of data processing system 400, representative of any computing system within data processing environment 100 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Data processing system 400 includes communications fabric 402, which provides communications between computer processor(s) 404, memory 406, persistent storage 408, communications unit 410, and input/output (I/O) interface(s)

412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416, which may include cache 124. In general, memory 406 can include any suitable volatile or non-volatile computer-readable storage media. Memory 406 and persistent storage 408 may be logically partitioned and allocated to one or more virtual machines and/or virtual volumes.

Computer programs and processes are stored in persistent storage 408 for execution by one or more of the respective computer processors 404 via one or more memories of memory 406. For example, processes implementing and managing thinly provisioned volumes may be stored in persistent storage 408. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including other computing systems of storage system 102. In these examples, communications unit 410 includes one or more network interface cards. Communications unit 410 may provide communications through the use of either or both physical and wireless communications links. Computer programs and processes may be downloaded to persistent storage 408 through communications unit 410.

I/O interface(s) 412 allows for input and output of data with other devices that may be connected to data processing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a computer monitor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing performance of a computer backup solution that includes at least a first data mover and a second data mover, the method comprising:
    measuring, by one or more processors, performance of the first data mover and the second data mover, respectively, during operation of a backup cycle, to produce performance statistics of the first data mover and performance statistics of the second data mover;
    operating, by one or more processors, a performance model operationally coupled with the first and second data movers wherein the performance model includes at least performance statistics of the first data mover that pertain to the performance of logical processes of the first data mover in transferring backup data from source virtual machine(s) to backup server(s) and performance statistics of the second data mover that pertain to the performance of logical processes of the second data mover in transferring backup data from source virtual machine(s) to backup server(s);
    initiating, by one or more processors, communications between the first data mover and the second data mover during at least a backup cycle, to exchange at least performance statistics between the first data mover and the second data mover;
    computing, by one or more processors, performance rankings with respect to virtual machine class, of a first data mover and a second data mover, based at least in part on performance statistics of the first data mover and performance statistics of the second data mover; and
    shifting, by one or more processors, workload from a first data mover to a second data mover, in accordance with their respective performance rankings, with respect to virtual machine class, such that the computer backup solution converges toward an optimized configuration.

2. The method of claim 1, wherein measuring, by one or more processors, performance of the first data mover and the second data mover, respectively, during operation of a backup cycle, to produce performance statistics of the first data mover and performance statistics of the second data mover, comprises:
    measuring performance statistics of the first data mover with respect to at least one virtual machine class processed by the first data mover, to produce performance statistics, by virtual machine class, of the first data mover; and
    measuring performance statistics of the second data mover with respect to at least one virtual machine class processed by the second data mover, to produce performance statistics, by virtual machine class, of the second data mover.

3. The method of claim 1, wherein optimizing, by one or more processors, performance of a data mover comprises:
    operating concurrently, one or more producer threads in the data mover;
    operating concurrently, one or more consumer threads in the data mover;
    changing the number of producer threads or consumer threads operating concurrently in the data mover; and
    measuring a change of performance of the data mover, in response to changing the number of producer threads or consumer threads operating concurrently in the data mover, to produce performance statistics on which to base, at least in part, a subsequent change in the number of producer threads or consumer threads operating concurrently in the data mover, such that the data mover converges toward an optimized performance state.

4. The method of claim 1, wherein operating, by one or more processors, a performance model operationally coupled with a data mover wherein the performance model includes at least performance statistics of the first data mover and performance statistics of the second data mover further comprises:
    storing at least performance statistics relative to a first data mover, in the performance model associated with the first data mover;
    storing at least performance statistics relative to a first data mover, in the performance model associated with the second data mover;
    storing at least performance statistics relative to a second data mover, in the performance model associated with the first data mover; and
    storing at least performance statistics relative to a second data mover, in the performance model associated with the second data mover.

5. The method of claim 1, wherein initiating, by one or more processors, communications between the first data mover and the second data mover, during at least a backup cycle, to exchange at least performance statistics between the first data mover and the second data mover, comprises a peer-to-peer model wherein the first data mover has access to the performance model of the second data mover and the second data mover has access to the performance model of the first data mover.

6. The method of claim 1, wherein computing, by one or more processors, performance rankings with respect to virtual machine class, of a first data mover and a second data mover, based at least in part on performance statistics of the first data mover and performance statistics of the second data mover comprises:
    analyzing respective performance statistics of the first data mover and the second data mover, with respect to virtual machine class, to produce performance rankings, by virtual machine class, of the first data mover and the second data mover.

7. The method of claim 1, wherein shifting, by one or more processors, workload from a first data mover to a second data mover, in accordance with their respective performance rankings, such that the computer backup solution converges toward an optimized configuration comprises:
    shifting some workload from virtual machines of a class, from the first data mover to the second data mover, based at least in part, on the performance rankings of the first data mover and the second data mover with respect to workload from virtual machines of the class.

8. A computer program product for optimizing performance of a computer backup solution that includes at least a first data mover and a second data mover, the computer program product comprising:
    one or more non-transitory computer readable tangible storage media; and
    program instructions stored on at least one of the one or more storage media, the program instructions comprising:
    program instructions to measure, by one or more processors, performance of the first data mover and the second data mover, respectively, during operation of a backup cycle, to produce performance statistics of the first data mover and performance statistics of the second data mover;
    program instructions to operate, by one or more processors, a performance model operationally coupled with the first and second data movers wherein the performance model includes at least performance statistics of the first data mover that pertain to the performance of logical processes of the first data mover in transferring backup data from source virtual machine(s) to backup server(s) and performance statistics of the second data mover that pertain to the performance of logical processes of the second data mover in transferring backup data from source virtual machine(s) to backup server(s);
    program instructions to initiate, by one or more processors, communications between the first data mover and the second data mover during at least a backup cycle, to exchange at least performance statistics between the first data mover and the second data mover;
    program instructions to compute, by one or more processors, performance rankings with respect to virtual machine class, of a first data mover and a second data mover, based at least in part on performance statistics of the first data mover and performance statistics of the second data mover; and
    program instructions to shift, by one or more processors, workload from a first data mover to a second data mover, in accordance with their respective performance rankings, with respect to virtual machine class, such that the computer backup solution converges toward an optimized configuration.

9. The computer program product of claim 8, wherein program instructions to measure, by one or more processors, performance of the first data mover and the second data mover, respectively, during operation of a backup cycle, to produce performance statistics of the first data mover and performance statistics of the second data mover, comprise:
    program instructions to measure performance statistics of the first data mover with respect to at least one virtual machine class processed by the first data mover, to produce performance statistics, by virtual machine class, of the first data mover; and
    program instructions to measure performance statistics of the second data mover with respect to at least one virtual machine class processed by the second data mover, to produce performance statistics, by virtual machine class, of the second data mover.

10. The computer program product of claim 8, wherein program instructions to optimize, by one or more processors, performance of a data mover comprise:
    program instructions to operate concurrently, one or more producer threads in the data mover;
    program instructions to operate concurrently, one or more consumer threads in the data mover;
    program instructions to change the number of producer threads or consumer threads operating concurrently in the data mover; and
    program instructions to measure a change of performance of the data mover, in response to changing the number of producer threads or consumer threads operating concurrently in the data mover, to produce performance statistics on which to base, at least in part, a subsequent change in the number of producer threads or consumer threads operating concurrently in the data mover, such that the data mover converges toward an optimized performance state.

11. The computer program product of claim 8, wherein program instructions to operate, by one or more processors, a performance model operationally coupled with a data mover wherein the performance model includes at least performance statistics of the first data mover and performance statistics of the second data mover further comprise:

program instructions to store at least performance statistics relative to a first data mover, in the performance model associated with the first data mover;

program instructions to store at least performance statistics relative to a first data mover, in the performance model associated with the second data mover;

program instructions to store at least performance statistics relative to a second data mover, in the performance model associated with the first data mover; and program instructions to store at least performance statistics relative to a second data mover, in the performance model associated with the second data mover.

12. The computer program product of claim 8, wherein program instructions to initiate, by one or more processors, communications between the first data mover and the second data mover, during at least a backup cycle, to exchange at least performance statistics between the first data mover and the second data mover, comprise a peer-to-peer model wherein the first data mover has access to the performance model of the second data mover and the second data mover has access to the performance model of the first data mover.

13. The computer program product of claim 8, wherein program instructions to compute, by one or more processors, performance rankings with respect to virtual machine class, of a first data mover and a second data mover, based at least in part on performance statistics of the first data mover and performance statistics of the second data mover comprise:

program instructions to analyze respective performance statistics of the first data mover and the second data mover, with respect to virtual machine class, to produce performance rankings, by virtual machine class, of the first data mover and the second data mover.

14. The computer program product of claim 8, wherein program instructions to shift, by one or more processors, workload from a first data mover to a second data mover, in accordance with their respective performance rankings, such that the computer backup solution converges toward an optimized configuration comprise:

program instructions to shift some workload from virtual machines of a class, from the first data mover to the second data mover, based at least in part, on the performance rankings of the first data mover and the second data mover with respect to workload from virtual machines of the class.

15. A computer system for optimizing performance of a computer backup solution that includes at least a first data mover and a second data mover, the computer system comprising:

one or more computer processors;

one or more non-transitory computer readable tangible storage media; and program instructions stored on at least one of the one or more storage media, the program instructions comprising:

program instructions to measure, by one or more processors, performance of the first data mover and the second data mover, respectively, during operation of a backup cycle, to produce performance statistics of the first data mover and performance statistics of the second data mover;

program instructions to operate, by one or more processors, a performance model operationally coupled with the first and second data movers wherein the performance model includes at least performance statistics of the first data mover that pertain to the performance of logical processes of the first data mover in transferring backup data from source virtual machine(s) to backup server(s) and performance statistics of the second data mover that pertain to the performance of logical processes of the second data mover in transferring backup data from source virtual machine(s) to backup server(s);

program instructions to initiate, by one or more processors, communications between the first data mover and the second data mover during at least a backup cycle, to exchange at least performance statistics between the first data mover and the second data mover;

program instructions to compute, by one or more processors, performance rankings with respect to virtual machine class, of a first data mover and a second data mover, based at least in part on performance statistics of the first data mover and performance statistics of the second data mover; and program instructions to shift, by one or more processors, workload from a first data mover to a second data mover, in accordance with their respective performance rankings, with respect to virtual machine class, such that the computer backup solution converges toward an optimized configuration;

wherein the first data mover is an instantiation of a first set of logical processes that transfers backup data from source virtual machine(s) to the backup server(s); and wherein the second data mover is an instantiation of a second set of logical processes that transfers backup data from source virtual machine(s) to the backup server(s).

16. The computer system of claim 15, wherein program instructions to measure, by one or more processors, performance of the first data mover and the second data mover, respectively, during operation of a backup cycle, to produce performance statistics of the first data mover and performance statistics of the second data mover, comprise:

program instructions to measure performance statistics of the first data mover with respect to at least one virtual machine class processed by the first data mover, to produce performance statistics, by virtual machine class, of the first data mover; and program instructions to measure performance statistics of the second data mover with respect to at least one virtual machine class processed by the second data mover, to produce performance statistics, by virtual machine class, of the second data mover.

17. The computer system of claim 15, wherein program instructions to optimize, by one or more processors, performance of a data mover comprise:

program instructions to operate concurrently, one or more producer threads in the data mover;

program instructions to operate concurrently, one or more consumer threads in the data mover;

program instructions to change the number of producer threads or consumer threads operating concurrently in the data mover; and program instructions to measure a change of performance of the data mover, in response to changing the number of producer threads or consumer threads operating concurrently in the data mover, to produce performance statistics on which to base, at least in part, a subsequent change in the number of producer threads or consumer threads operating concurrently in the data mover, such that the data mover converges toward an optimized performance state.

18. The computer system of claim 15, wherein program instructions to operate, by one or more processors, a performance model operationally coupled with a data mover wherein the performance model includes at least performance statistics of the first data mover and performance statistics of the second data mover further comprise:
- program instructions to store at least performance statistics relative to a first data mover, in the performance model associated with the first data mover;
- program instructions to store at least performance statistics relative to a first data mover, in the performance model associated with the second data mover;
- program instructions to store at least performance statistics relative to a second data mover, in the performance model associated with the first data mover; and
- program instructions to store at least performance statistics relative to a second data mover, in the performance model associated with the second data mover.

19. The computer system of claim 15, wherein program instructions to initiate, by one or more processors, communications between the first data mover and the second data mover, during at least a backup cycle, to exchange at least performance statistics between the first data mover and the second data mover, comprise a peer-to-peer model wherein the first data mover has access to the performance model of the second data mover and the second data mover has access to the performance model of the first data mover.

20. The computer system of claim 15, wherein program instructions to shift, by one or more processors, workload from a first data mover to a second data mover, in accordance with their respective performance rankings, such that the computer backup solution converges toward an optimized configuration comprise:
- program instructions to shift some workload from virtual machines of a class, from the first data mover to the second data mover, based at least in part, on the performance rankings of the first data mover and the second data mover with respect to workload from virtual machines of the class.

* * * * *